United States Patent
Won et al.

(10) Patent No.: US 10,454,543 B2
(45) Date of Patent: Oct. 22, 2019

(54) METHOD AND APPARATUS FOR TRANSMITTING SIGNAL USING MULTIPLE RADIO UNITS

(71) Applicant: ELECTRONICS AND TELECOMMUNICATIONS RESEARCH INSTITUTE, Daejeon (KR)

(72) Inventors: Seuck Ho Won, Daejeon (KR); Yeong Jin Kim, Daejeon (KR); Il Gyu Kim, Chungcheongbuk-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/831,539

(22) Filed: Dec. 5, 2017

(65) Prior Publication Data
US 2018/0159604 A1   Jun. 7, 2018

(30) Foreign Application Priority Data

Dec. 5, 2016   (KR) .................. 10-2016-0164475
Dec. 5, 2017   (KR) .................. 10-2017-0166052

(51) Int. Cl.
| | | |
|---|---|---|
| *H04B 7/0456* | (2017.01) | |
| *H04B 7/024* | (2017.01) | |
| *H04B 7/0426* | (2017.01) | |
| *H04B 7/0417* | (2017.01) | |
| *H04W 28/06* | (2009.01) | |

(52) U.S. Cl.
CPC ........... *H04B 7/0456* (2013.01); *H04B 7/024* (2013.01); *H04B 7/043* (2013.01); *H04B 7/0417* (2013.01); *H04W 28/06* (2013.01)

(58) Field of Classification Search
CPC .... H04B 7/0456; H04B 7/024; H04B 7/0417; H04B 7/043; H04W 28/06
See application file for complete search history.

(56) References Cited

U.S. PATENT DOCUMENTS 8,509,831 B2 *   8/2013   Acharya ........... H04W 72/1231
                                              455/333
8,750,401 B2     6/2014   Kyeong et al.
(Continued)

OTHER PUBLICATIONS

"MIMO I: Spatial Multiplexing and Channel Modeling", Fundamentals of Wireless Communications: Cambridge University Press, 2004.

*Primary Examiner* — Michael Thier
*Assistant Examiner* — Nevena Zecevic Sandhu
(74) *Attorney, Agent, or Firm* — LRK Patent Law Firm

(57) ABSTRACT

A method and an apparatus for transmitting a signal by using a plurality of radio units (RUs) to a user equipment (UE). The apparatus is configured to: determine an RU set including at least two RUs of the plurality of the RUs based on a feedback regarding a received strength of a transmission beam formed by the plurality of the RUs, wherein the feedback is received from the UE; determine a distributed precoding matrix of which a diversity order is predetermined based on information about an RU included in the RU set; and perform a precoding based on the distributed precoding matrix and transmitting a precoded signal to the UE through the RU set.

2 Claims, 12 Drawing Sheets

(56) References Cited

U.S. PATENT DOCUMENTS

| | | | | |
|---|---|---|---|---|
| 2003/0064754 A1* | 4/2003 | Wilson | ............ | H04W 16/28 |
| | | | | 455/562.1 |
| 2007/0281633 A1* | 12/2007 | Papadopoulos | ........ | H04B 7/024 |
| | | | | 455/101 |
| 2009/0296626 A1* | 12/2009 | Hottinen | ............ | H04B 7/155 |
| | | | | 370/315 |
| 2014/0064394 A1* | 3/2014 | Wang | ............ | H04B 7/0456 |
| | | | | 375/267 |
| 2014/0073331 A1* | 3/2014 | Lee | ............ | H04W 72/048 |
| | | | | 455/444 |
| 2014/0094169 A1* | 4/2014 | Takano | ............ | H04W 48/16 |
| | | | | 455/434 |
| 2014/0212129 A1* | 7/2014 | Huang | ............ | H04W 48/20 |
| | | | | 398/2 |
| 2015/0063201 A1 | 3/2015 | Kim et al. | | |
| 2015/0063203 A1 | 3/2015 | Kim et al. | | |
| 2016/0112970 A1 | 4/2016 | Chen et al. | | |
| 2017/0064566 A1* | 3/2017 | Elsherif | ............ | H04W 16/28 |
| 2017/0126309 A1* | 5/2017 | Rupasinghe | ....... | H04B 7/18506 |
| 2017/0294946 A1* | 10/2017 | Wang | ............ | H04B 7/0413 |
| 2018/0352411 A1* | 12/2018 | Ryu | ............ | H04W 40/08 |

\* cited by examiner

METHOD AND APPARATUS FOR TRANSMITTING SIGNAL USING MULTIPLE RADIO UNITS

CROSS-REFERENCE TO RELATED APPLICATIONS

This application claims priority to and the benefit of Korean Patent Application Nos. 10-2016-0164475 and 10-2017-0166052, filed in the Korean Intellectual Property Office on Dec. 5, 2016, and Dec. 5, 2017, respectively, the entire contents of which are incorporated herein by reference.

BACKGROUND OF THE INVENTION

1. Field of the Invention

The present description relates to a method and an apparatus for transmitting signals by using a plurality of RUs.

2. Description of Related Art

In a beamforming communication system using a distributed array antenna, communications are mostly performed along a Line of Sight (LoS). Millimeter waves with a short frequency are mainly used, and array antennas use beamforming technology to maximize power efficiency. Multi-user wireless systems using the unlicensed band limit transmit power of the radio signal to reduce interference to other devices. This is called a wireless power limited system.

On the other hand, the system capacity of a multi-user wireless system using a licensed band is referred to as a wireless band limiting system since it is determined by the number of frequency bands. Therefore, in the design of systems that use licensed bands, increasing frequency efficiency is the most important goal.

SUMMARY OF THE INVENTION

An exemplary embodiment provides a method for transmitting a signal by using a plurality of radio units (RUs) connected to a base station to a user equipment (UE). The method includes: determining an RU set including at least two RUs of the plurality of the RUs based on a feedback regarding a received strength of a transmission beam formed by the plurality of the RUs, wherein the feedback is received from the UE; determining a distributed precoding matrix of which a diversity order is predetermined based on information about an RU included in the RU set; and performing a precoding based on the distributed precoding matrix and transmitting a precoded signal to the UE through the RU set.

The determining of the RU set may include: grouping at least two RUs which transmit beams corresponding to the feedback; and determining the RU set based on a channel matrix between the UE and the grouped at least two RUs.

The determining of the RU set based on the channel matrix may include determining an RU set of which ratio of singular values of the channel matrix is closest to 1.

The determining of the RU set based on the channel matrix may further include excluding an RU set of which a difference between directional cosines corresponding to the at least two RU included in the RU set is 0 from the decision.

The determining of the RU set based on the channel matrix may further include excluding an RU set of which a determinant of the channel matrix is 0 from the decision.

The determining of the RU set based on the channel matrix may include determining an RU set of which a difference between directional cosines corresponding to the at least two RU is 0 among m RU sets of which ratio of singular values of the channel matrix is closest to 1.

The determining of the RU set based on the channel matrix may include determining an RU set of which ratio of singular values of the channel matrix is closest to 1 among m RU sets of which a difference between directional cosines corresponding to the at least two RU is 0.

The determining of the RU set based on the channel matrix may include determining an RU set among RU sets of which a difference between directional cosines corresponding to the at least two RU is not 0.

The determining of the RU set based on the channel matrix may include determining an RU set among RU sets of which a determinant of the channel matrix is not 0.

The feedback may include an identifier of the transmission beam and an identifier of an RU which forms the transmission beam.

Another exemplary embodiment provides an apparatus for transmitting a signal by using a plurality of radio units (RUs) to a user equipment (UE). The apparatus includes a processor, a memory, and a radio frequency unit (RF unit), wherein the processor executes a program stored in the memory to perform: determining an RU set including at least two RUs of the plurality of the RUs based on a feedback regarding a received strength of a transmission beam formed by the plurality of the RUs, wherein the feedback is received from the UE; determining a distributed precoding matrix of which a diversity order is predetermined based on information about an RU included in the RU set; and performing a precoding based on the distributed precoding matrix and transmitting a precoded signal to the UE through the RU set.

When performing the determining of the RU set, the processor may perform: grouping at least two RUs which transmit a beam corresponding to the feedback; and determining the RU set based on a channel matrix between the UE and the grouped at least two RUs.

When performing the determining of the RU set based on the channel matrix, the processor may perform determining an RU set of which ratio of singular values of the channel matrix is closest to 1.

When performing the determining of the RU set based on the channel matrix, the processor may further perform excluding an RU set of which a difference between directional cosines corresponding to the at least two RU included in the RU set is 0 from the decision.

When performing the determining of the RU set based on the channel matrix, the processor may further perform excluding an RU set of which a determinant of the channel matrix is 0 from the decision.

When performing the determining of the RU set based on the channel matrix, the processor may perform determining an RU set of which a difference between directional cosines corresponding to the at least two RU is 0 among m RU sets of which ratio of singular values of the channel matrix is closest to 1.

When performing the determining of the RU set based on the channel matrix, the processor may perform determining an RU set of which ratio of singular values of the channel matrix is closest to 1 among m RU sets of which a difference between directional cosines corresponding to the at least two RU is 0.

When performing the determining of the RU set based on the channel matrix, the processor may perform determining an RU set among RU sets of which a difference between directional cosines corresponding to the at least two RU is not 0.

When performing the determining of the RU set based on the channel matrix, the processor may perform determining an RU set among RU sets of which a determinant of the channel matrix is not 0.

The feedback may include an identifier of the transmission beam and an identifier of an RU which forms the transmission beam.

DETAILED DESCRIPTION OF THE EMBODIMENTS

Figure 1:
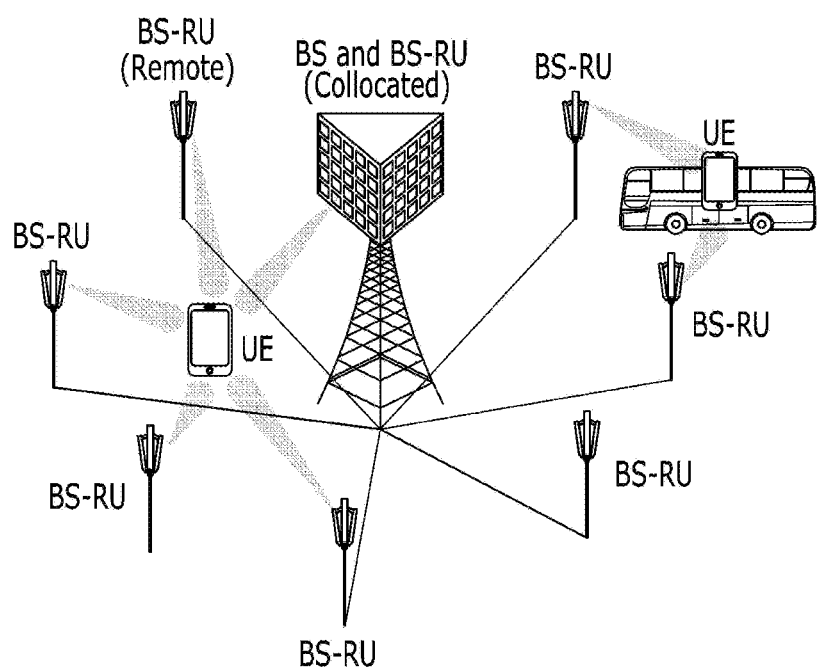
FIG. 1 is a schematic diagram illustrating a distributed array antenna system according to an exemplary embodiment.

Hereinafter, exemplary embodiments of the present disclosure will be described in detail with reference to the accompanying drawings so that those skilled in the art may easily practice the present disclosure. However, the present disclosure may be modified in various different ways and is not limited to embodiments described herein. In the accompanying drawings, portions unrelated to the description will be omitted in order to obviously describe the present disclosure, and similar reference numerals will be used to describe similar portions throughout the present specification.

Throughout the specification, a user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

FIG. 1 is a schematic diagram illustrating a distributed array antenna system according to an exemplary embodiment.

Referring to FIG. 1, a distributed array antenna environment is composed by a plurality of distributed radio units (RUs) connected to a base station (BS-RU).

The base station includes a digital unit (DU), where the RU is collocated with the DU or is distributively wired to the DU. The RU is also referred to as a remote radio head (RRH). A beam-formed transmission/reception is performed between the RU the user equipment (UE). The beamforming technique may increase the power efficiency since the power for signal transmission and reception can be spatially collected when it is used.

However, the beamforming technique may not increase the frequency efficiency (i.e., system capacity) or increase the diversity gain in the LoS channel environment. In a multi-path channel other than the LoS channel environment, if a certain condition such as a difference in correlation between two path signals is satisfied, a spatial dimension is additionally provided to the wireless communication system (spatial dimension is further added) and the frequency efficiency and the diversity gain may be increased through a spatial multiplexing scheme.

In addition, two or more RUs may communicate with one UE in order to minimize interference and maximize diversity gain in communication between the RUs and the UE, and to increase radio resource utilization efficiency or frequency efficiency.

For example, if two RUs communicate with one UE, a rank of a channel matrix of the radio channel is 2. Further, additional conditions may be needed to increase the frequency efficiency and the diversity gain. It is assumed that a ratio between the eigenvalues of the channel matrix of the radio channel is a condition number (CN) value. If the CN value is much larger than 1, the degree of freedom (DoF) gain may not increase. Also, if the frequency efficiency is increased through the DoF gain, since the frequency efficiency is increased from the condition of the channel, it is difficult to obtain the diversity gain additionally.

Figure 2:
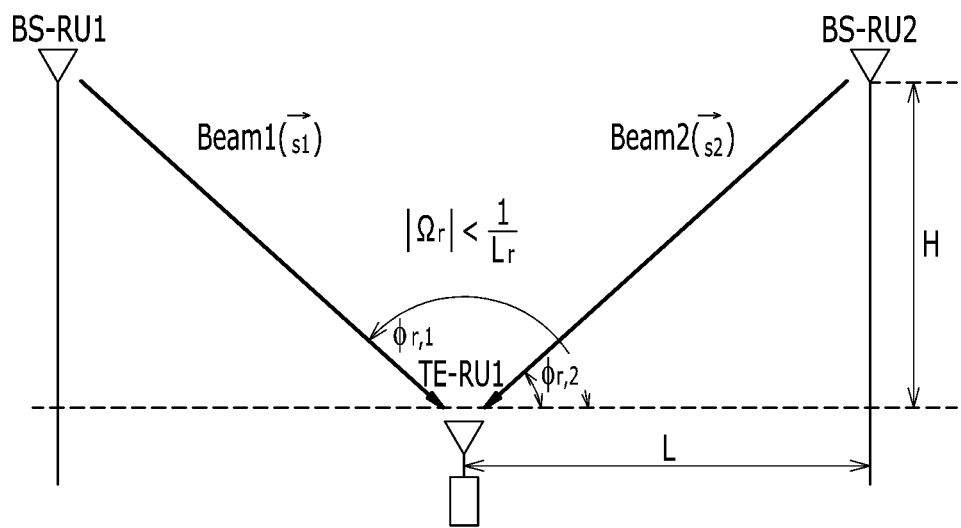
FIG. 2 is a schematic diagram illustrating a wireless communication system according to an exemplary embodiment.

FIG. 2 is a schematic diagram illustrating a wireless communication system according to an exemplary embodiment.

Referring to FIG. 2, a beam-formed transmission is performed from the two RUs (first RU and second RU) to the UE-RU included in the vehicle.

The first RU sends a first beam ($\bar{s}_1$) to the UE-RU, and the second RU sends a second beam ($\bar{s}_2$) to UE-RU. A distance between the UE-RU and the RU is denoted by L, and a height of the RU is denoted by H.

Hereinafter, the present specification assumes the array antenna as Uniform Linear Array Antenna (ULA) and describes all characteristics and related equations of the array antenna for the ULA. However, the present specification may be also adopted for any other types of array antennas like Circular Linear Array Antenna (CLA), Rectangular Plannar Array Antenna (RPA) and so on with the slight changes of the equations described in the present specification. Therefore, the equations described below give exemplary examples for the adoption of the present specification. In other word, equations may be changed if the array antenna type is changed. However, the present specification is not limited thereto.

Therefore, an angle formed by the second beam of the second RU with the horizontal direction (the direction in which element antennas of the array antenna of the UE are arranged) is $$\phi_{r,2} = \arctan\left(\frac{H}{L}\right).$$

$\Omega_{r,i}:=\cos \phi_{r,i}$, i=1,2 is referred to as a directional cosine. $\phi_{r,i}$ may be also defined by the angle between the line of the array of the ULA and the direction of the beam generated by the ULA.

Assuming that a vector of the transmission signal is x and the channel matrix is h, a vector of the reception signal is given by Equation 1.

$$y=hx+w \quad \text{(Equation 1)}$$

In Equation 1, w is an additive white Gaussian noise vector. The channel matrix H is expressed by Equation 2 below.

$$H=[h_1\ h_2] \quad \text{(Equation 2)}$$

In Equation 2 the $h_1$ denotes a channel between the $RU_1$ and the UE, and the $h_2$ denotes a channel between the $RU_2$ and the UE. The row vector ($h_1$ or $h_2$) of the channel matrix between the two RUs and the UE-RU of the FIG. 2 is expressed as Equation 3 below.

$$h = a\exp\left(-\frac{j2\pi d}{\lambda_c}\right)\begin{bmatrix} 1 \\ \exp(-j2\pi\Delta_r\Omega) \\ \exp(-j2\pi 2\Delta_r\Omega) \\ \vdots \\ \exp(-j2\pi(n_r-1)\Delta_r\Omega) \end{bmatrix} \quad \text{(Equation 3)}$$

In Equation 3, 'a' denotes a path attenuation value from an element antenna of the array antenna of the transmission point to the reception point. The, path attenuation is assumed to be the same in all element antennas. 'd' denotes a distance from the first element antenna of the transmission point to the reception point, $\lambda_c$ denotes a wavelength of a carrier frequency, $\Delta_r$ denotes a distance (spacing) between the element antennas of the reception point which is normalized by the wavelength of the carrier frequency, and $n_r$ denotes the number of element antennas of the receiving array antenna of the UE-RU.

It is assumed that the size of the array antenna of the reception point is very small compared to the distance between the transmission point and the reception point. The subscription r of each variable represents the reception point. The vector portion of Equation 3 may be expressed by a function $e_r(\Omega)$ for $\Omega:=\cos \phi$ as shown in Equation 4.

$$e_r(\Omega) := \frac{1}{\sqrt{n_r}}\begin{bmatrix} 1 \\ \exp(-j2\pi\Delta_r\Omega) \\ \exp(-j2\pi 2\Delta_r\Omega) \\ \vdots \\ \exp(-j2\pi(n_r-1)\Delta_r\Omega) \end{bmatrix} \quad \text{(Equation 4)}$$

The function $e_r(\Omega)$ is an unit spatial signature for the directional cosine $\Omega$. An optimal receiver according to the exemplary embodiment is a receiver capable of projecting a noisy received signal to a $e_r(\Omega)$ direction (that is, a signal direction) of the channel h. A channel gain $h_k$ for each path according to Equation 2 to Equation 4 is expressed by Equation 5.

$$h_k = a_k \sqrt{n_r} \exp\left(\frac{-j2\pi d_{1,k}}{\lambda_c}\right) e_r(\Omega_{r,k}), k=1,2 \quad \text{(Equation 5)}$$

In Equation 5, $d_{1,k}$ denotes a distance from the k-th transmission antenna to the first element antenna of the reception point. In Equation 5, $h_k$ is referred to as the signal direction or the spatial signature. The period of the unit spatial signature function $e_r(\Omega)$ is $1/\Delta_r$. If a condition of Equation 6 is satisfied, the channel matrix H of Equation 2 may have rows that are linearly independent.

$$\Omega_r := \Omega_{r2} - \Omega_{r1} \neq 0 \bmod \frac{1}{\Delta_r} \quad \text{(Equation 6)}$$

When Equation 6 is satisfied, the channel matrix H may have a full rank with two non-zero singular values $\lambda_1^2$ and $\lambda_2^2$ (the square of the eigen value). However, although H has full rank, the spectral efficiency may not be increased if the channel matrix does not have a degree of freedom (DoF) of 2.

That is, even if the channel matrix is a full rank, the DoF may not be 2 if there is a difference in the size of the singular value. When the difference in the size of the singular value of the channel matrix occurs, it is referred to as an ill-condition. The variables that is used for measuring the ill-condition may be derived as follows. The angle θ between the two spatial signatures $e_{r1}(\Omega)$ $e_{r2}(\Omega)$ of the FIG. 2 may be presented as shown in Equation 7 by the inner product of the two spatial signature vectors.

$$|\cos\theta|:=|e_r(\Omega_{r1})^*e_r^*(\Omega_{r2})|:=|f(\Omega_r)| \quad \text{(Equation 7)}$$

Here, $e_r(\Omega_{r1})^*e_r(\Omega_{r2})$ may be determined by $\Omega_r:=\Omega_{r2}-\Omega_{r1}$, and Equation 7 is summarized as Equation 8 below.

$$|f(\Omega_r)| = |f(\Omega_{r2}-\Omega_{r1})| = |\cos\theta| = \left|\frac{\sin(\pi L_r\Omega_r)}{n_r\sin(\pi L_r\Omega_r/n_r)}\right| \quad \text{(Equation 8)}$$

Figure 3:
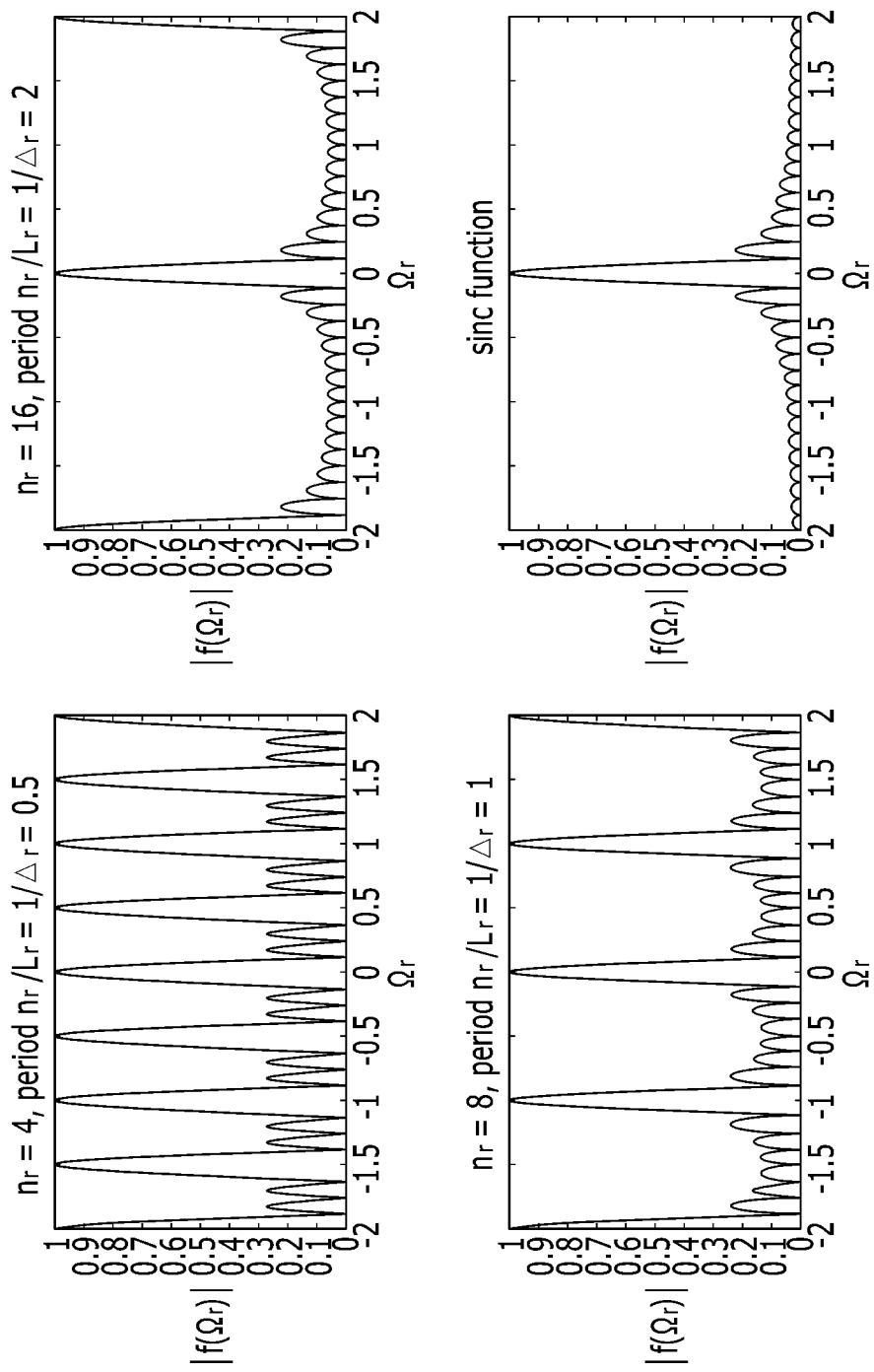
FIG. 3 shows several graphs illustrating the $|f(\Omega_r)|$ for some $\Delta_r$ and $n_r$.

$|f(\Omega_r)|$ in Equation 8 may be expressed as a function for $\Delta_r$ and $n_r$ through Equation 4, and FIG. 3 shows several graphs illustrating the $|f(\Omega_r)|$ for some $\Delta_r$ and $n_r$. $\Delta_r$ is the distance (spacing) between the transmission element antennas normalized to the wavelength, and $n_r$ is the number of the element antennas of the reception array antenna. The total length of the normalized linear antenna is $L_r=n_r\Delta_r$.

According to an exemplary embodiment, the base station may determine whether the at least two RUs to transmit data to the UE are suitable RUs to maximize the frequency efficiency by determining whether the $|\cos \theta|$ of Equation 8 is close to 1.

The singular value of the channel matrix is expressed by Equation 9 below.

$$\lambda_1{}^2 = a^2 n_r(1+|\cos \theta|)$$

$$\lambda_2{}^2 = a^2 n_r(1-|\cos \theta|) \quad \text{(Equation 9)}$$

The condition number (CN) calculated by using Equation 9 is expressed by Equation 10.

$$\frac{\lambda_1}{\lambda_2} = \sqrt{\frac{1+|\cos\theta|}{1-|\cos\theta|}} \quad \text{(Equation 10)}$$

For DoF of the channel to be 2, the ratio of the two non-zero singular values $\lambda_1{}^2$ and $\lambda_2{}^2$ should approach to the value 1. That is, the two non-zero singular values should have similar values each other for the frequency efficiency. A state in which the ratio of the two singular values is close to 1 is referred to as a well-condition. In contrast, when $|\cos \theta| \approx 1$, Equation 10 becomes infinite and the state of the channel is the ill-condition.

Based on the graphs of the FIG. 3, the values of the signature variable $\Omega_r$ that yields $|f(\Omega_r)|=|\cos \theta|\approx 1$ for some $L_r$, $\Delta_r$ and $n_r$ may be calculated as some examples. For the calculation result based on the graphs of the FIG. 3, even if the channel is the full rank, the DoF of the channel is not 2 but 1.

For example, when the spacing between the element antennas of the array antenna is $$\Delta_r \leq \frac{1}{2},$$

the state of the channel corresponds to the II-condition and the DoF is 1.

Meanwhile, directional cosine variable $\Omega := \cos \phi$ is closely related to the total length of the ULA, $L_r$ and in order to avoid $|\Omega|:=|\cos \phi|=1$ the present specification sets the variable relation as (Equation 11). The $L_r$ is distinguished from variable L denoting the distance between BS-RU and UE as shown in FIG. 2

$$|\Omega_r| \ll \frac{1}{L_r} \quad \text{(Equation 11)}$$

Therefore, in Equation 11, $$\frac{1}{L_r}$$

is related to the resolution of the transmission/reception beam. The physical meaning of Equation 11 is as follows. When the $L_r$ is larger, the resolution for discriminating two adjacent beams is improved so that the small differences may be distinguished. That is, when the $L_r$ is somewhat large, the DoF may be 2 because $|\Omega|:=|\cos \phi|\neq 1$ even if the $|\Omega_r|$ is slightly larger.

Referring to FIG. 4 to FIG. 10, a method for maximizing the diversity gain while maximizing the DoF (i.e., maximizing the frequency efficiency) is described below.

Figure 4:
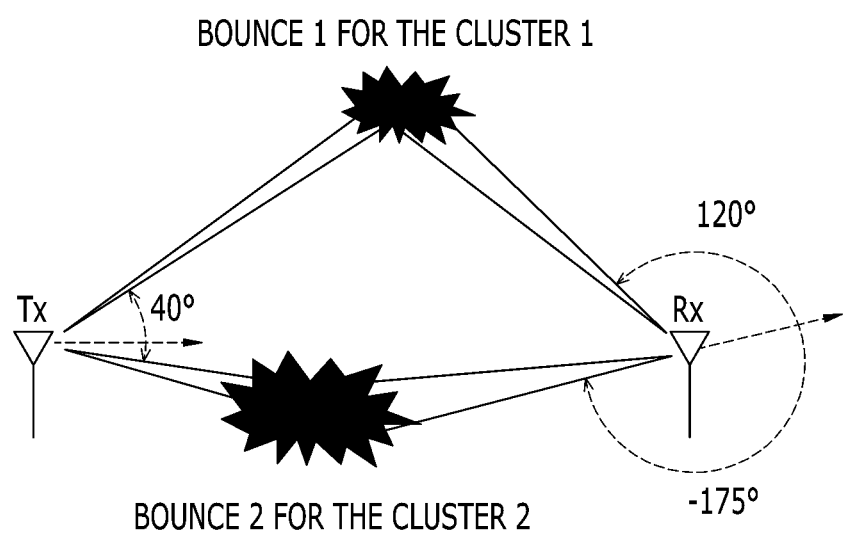
FIG. 4 is schematic diagram illustrating beam-formed transmission/reception system in which two bounces for clusters are included according to an exemplary embodiment.
Figure 5:
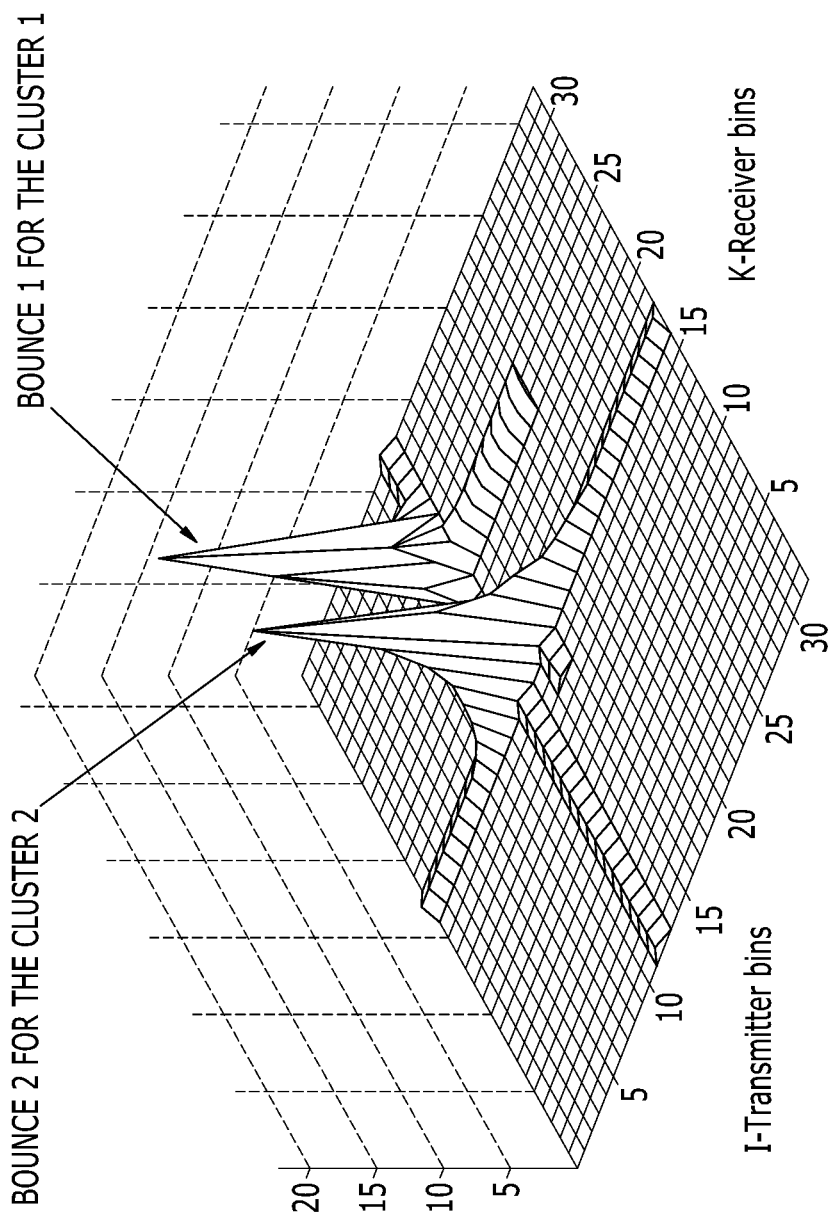
FIG. 5 is, a graph illustrating an angular domain response of the channel matrix of the beam-formed transmission/reception system in which two bounces for clusters are included according to the exemplary embodiment.

FIG. 4 is schematic diagram illustrating beam-formed transmission/reception system in which two bounces for clusters are included according to an exemplary embodiment, and FIG. 5 is a graph illustrating an angular domain response of the channel matrix of the beam-formed transmission/reception system in which two bounces for clusters are included according to the exemplary embodiment.

In FIG. 4, the number of the observed beam from the transmission point and the reception point is 2. Each beam arrives at the reception point after being bounced at cluster 1 and cluster 2. Referring to FIG. 5, the angular domain response of the channel matrix has two peaks, and the diversity order is 2.

Figure 6:
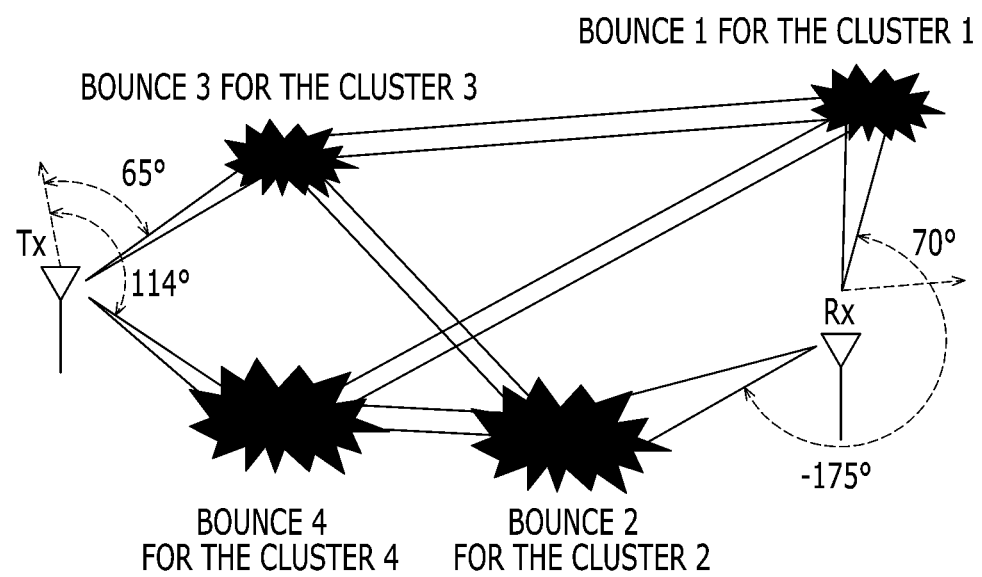
FIG. 6 is schematic diagram illustrating beam-formed transmission/reception system in which four bounces for clusters are included according to another exemplary embodiment.
Figure 7:
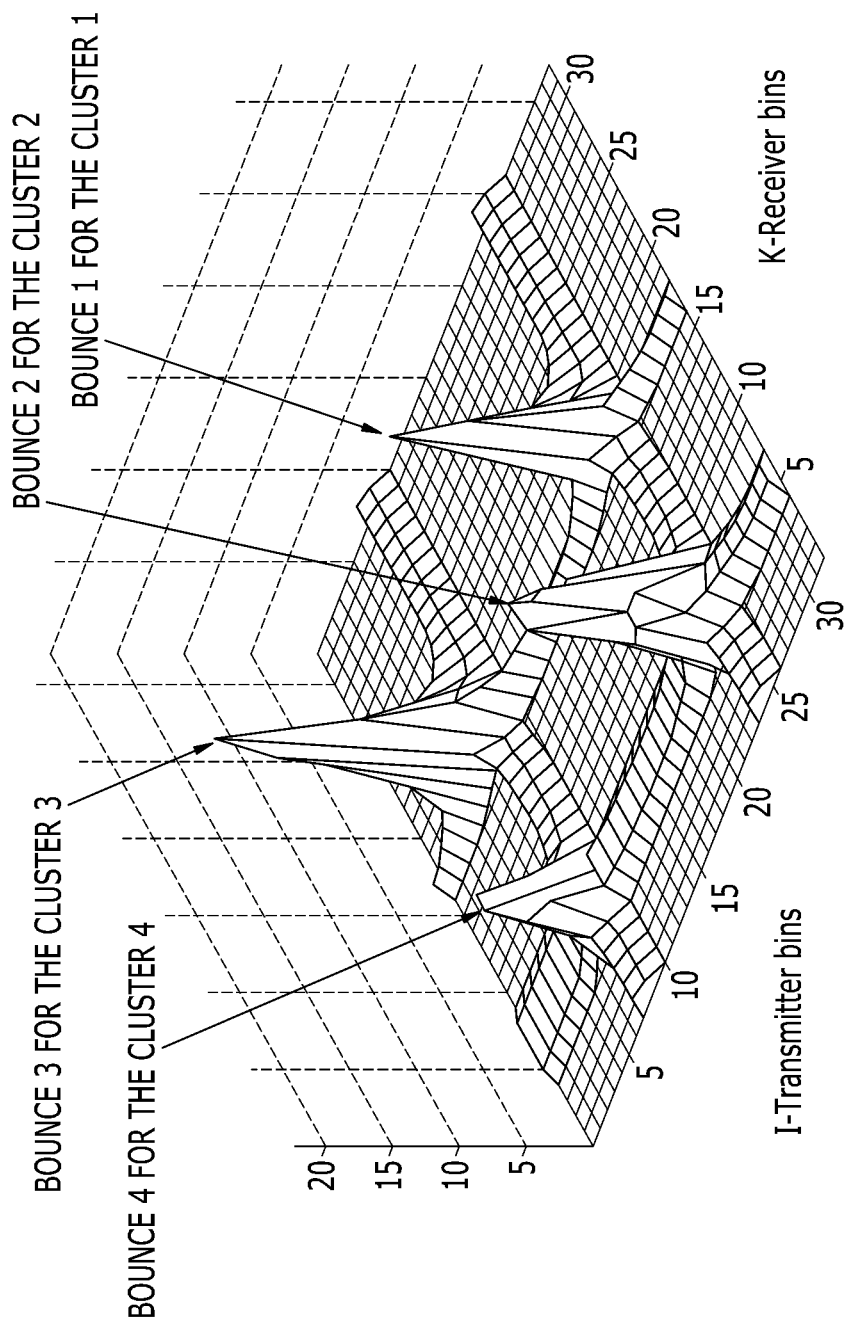
FIG. 7 is a graph illustrating an angular domain response of the channel matrix of the beam-formed transmission/reception system in which four bounces for clusters are included according to the another exemplary embodiment.

FIG. 6 is schematic diagram illustrating beam-formed transmission/reception system in which four bounces for clusters are included according to another exemplary embodiment, and FIG. 7 is a graph illustrating an angular domain response of the channel matrix of the beam-formed transmission/reception system in which four bounces for clusters are included according to the another exemplary embodiment.

In FIG. 6, the number of the observed beam from the transmission point and the reception point is 2, respectively. However, since each beam is reflected twice by the clusters on the radio channel, the number of the paths for all beams is four. Referring to FIG. 7, the angular domain response of the channel matrix has four peaks, and the diversity order is 4.

According to an exemplary embodiment, the base station may determined a distributed precoding matrix by modeling clusters that reflect the beam. The base station may perform precoding on the data symbols to be transmitted to the UE by using the distributed precoding matrix and the UE receiving the precoded data symbols may obtain the diversity gain.

Figure 8:
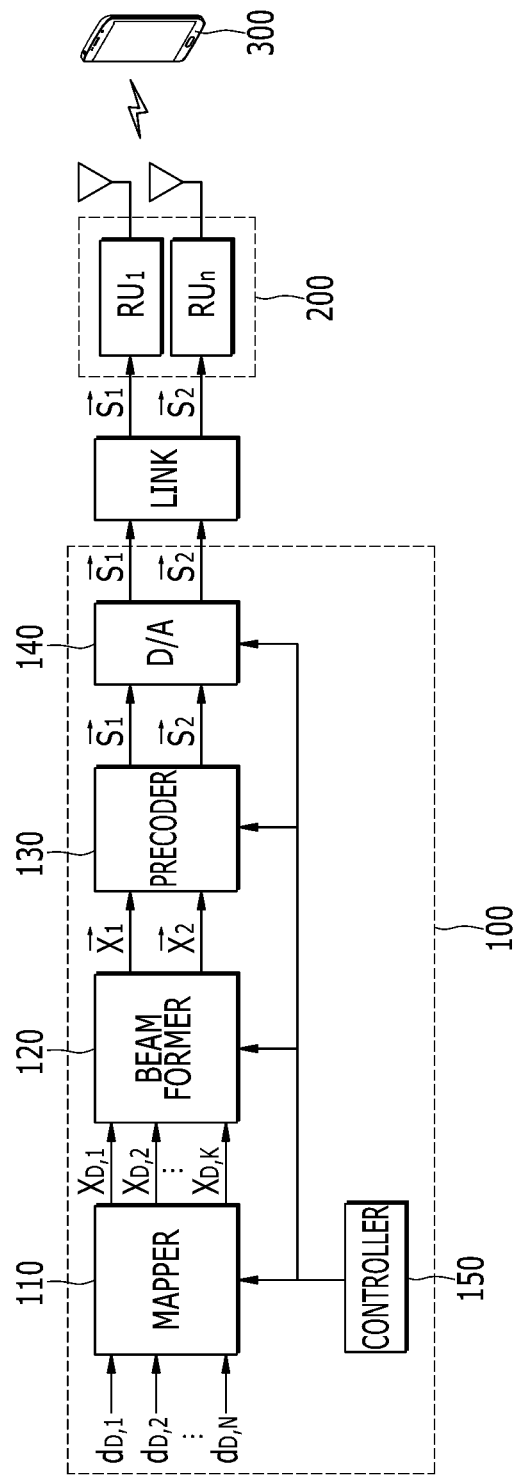
FIG. 8 is a block diagram illustrating a wireless communication system including a base station and a UE according to an exemplary embodiment.
Figure 9:
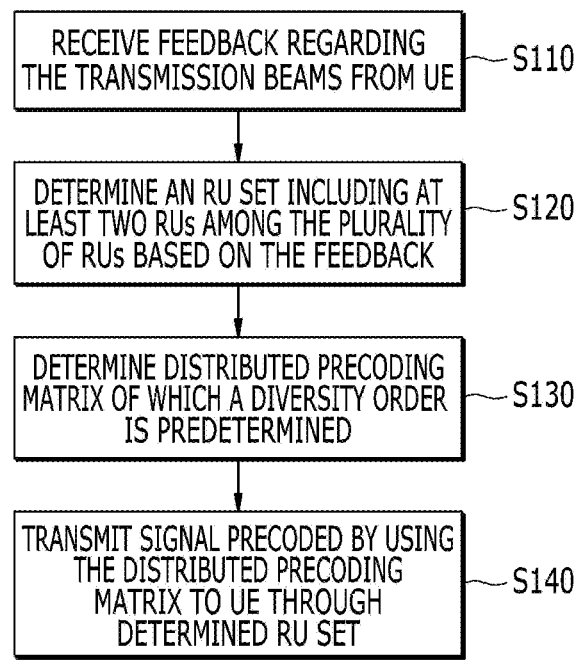
FIG. 9 is a flow chart illustrating a signal transmission method of the base station according to an exemplary embodiment.
Figure 10:
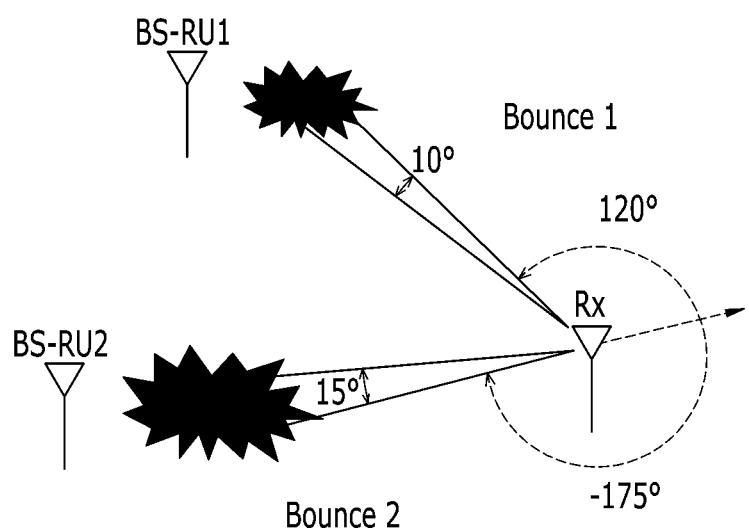
FIG. 10 and FIG. 11 are schematic diagrams illustrating an effect of the distributed precoding matrix according to an exemplary embodiment.
Figure 11:
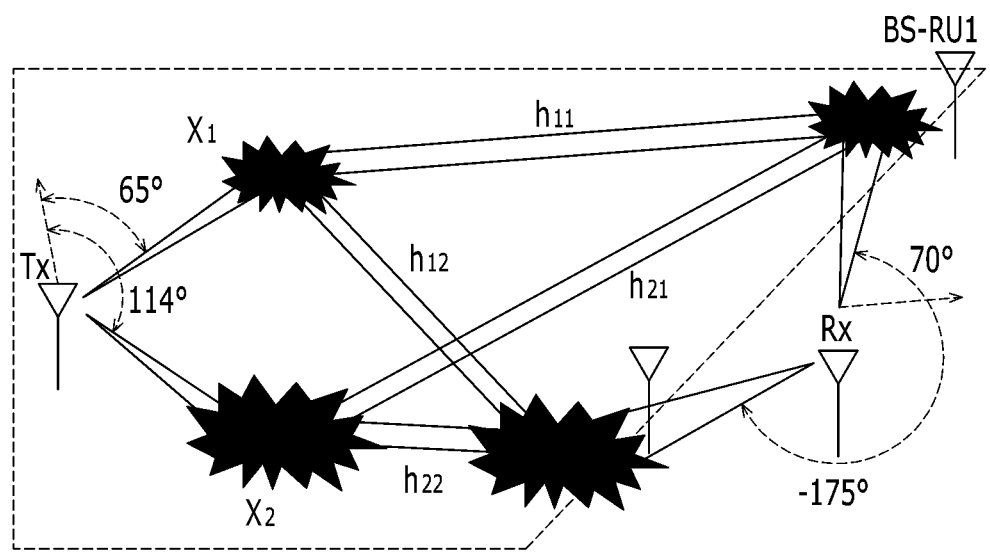

FIG. 8 is a block diagram illustrating a wireless communication system including a base station and a UE according to an exemplary embodiment, FIG. 9 is a flow chart illustrating a signal transmission method of the base station according to an exemplary embodiment, and FIG. 10 and FIG. 11 are schematic diagrams illustrating an effect of the distributed precoding matrix according to an exemplary embodiment.

Referring to FIG. 8, a base station (or a BS-DU) 100 according to an exemplary embodiment includes a mapper 110, a beamformer 120, a precoder 130, a Digital to Analog (D/A) 140, and a controller 150.

The base station 100 is connected to the plurality of the RUs 200 through a Radio of Fiber (RoF). In the present description, the base station 100 may include the BS-DU and RU 200, and the function of the BS-DU may be described as a function of the base station 100.

The mapper 110 may perform mapping data $d_{D,1}$-$d_{D,N}$ to be transmitted to the UE to the signals $x_{D,1}$-$x_{D,K}$.

The beamformer 120 may form a transmission beam based on the estimation result for the channel.

The precoder 130 may perform precoding on the transmission beam.

The D/A 140 may convert digital signals into analog signals and transmit it to the plurality of the RUs 200 through the link.

The controller 150 may control the mapper 110, the beamformer 120, the precoder 130, and the D/A 140.

According to the exemplary embodiment, the control unit 150 determines a distributed precoding matrix, so that the precoder 130 performs precoding on a transmission beam formed in the beamformer 120.

Referring to FIG. 9 to FIG. 11, a signal transmission method of the base station 100 is described in detail.

Referring to FIG. 9, the BS 100 receives a feedback regarding a plurality of transmission beams transmitted through a plurality of the RUs 200 from the UE 300 (S110). According to the exemplary embodiment, each of the RU 200 forms a transmission beam by using a transmit array antenna, and the UE 300 measures the reception strength of the transmission beam. The UE 300 may measure the reception strength of the transmission beams and may transmit feedback regarding the transmission beams to the base station 100 according to a predetermined criterion. The feedback may include identifiers of the transmission beams and identifiers of at least one RU which forms the transmission beam.

For example, the UE 300 may transmit identifiers of the transmission beam which are measured larger than a predetermined strength to the base station 100. That is, the UE 300 may transmit the identifiers of the transmission beams having a reception power of P or higher than P to the base station 100. P is the predetermined strength measured by the UE 300.

Alternatively, the UE 300 may transmit identifiers of a predetermined number of the transmission beams to the base station 100. For example, the UE 300 may transmit identifiers of n beams to the base station 100 in the order of the largest received strength. n is the predetermined number of the transmission beams.

Alternatively, the UE 300 may transmit identifiers of the transmission beams having the highest intensity among the transmission beams of each RU to the base station 100. In this case, the number of identifiers of the transmission beams included in the feedback may be equal to or greater than the number of the RUs.

Then, the BS 100 determines an RU set including at least two RUs to transmit signals to the UE 300 among the plurality of the RUs 200 based on the feedback from the UE 300 (S120). The base station 100 according to an exemplary embodiment groups at least two RUs that transmit beams corresponding to the feedback of the UE 300 into RU sets and determines a RU set capable of maximizing the frequency efficiency among the grouped RU sets.

According to the exemplary embodiment, the base station 100 may determine the RU set that can maximize frequency efficiency based on the channel matrix between the UEs and at least two RUs included in each grouped RU set.

When the number of RUs transmitting the beams corresponding to the feedback of the UE 300 is s, when the base station 100 transmits signals to the UE 300 by using two RUs, the number of RU sets to be searched is $_sC_2$. Alternatively, when the base station 100 transmits signals to the UE 300 by using three RUs, the number of RU sets to be searched is $_sC_3$.

For example, when there are four RUs transmitting transmission beams corresponding to the feed back by the UE 300 and the number of the RUs to be included in the RU set is 2, the base station 100 searches 6 RU sets ($_4C_2$). When the number of the RUs to be included in the RU set is 3, the base station 100 searches four RU sets ($_4C_3$).

The base station 100 may use Equations 6 and 10 when determining whether at least two RUs included in the RU set are suitable as RUs to transmit signals. If the number of RUs included in the RU set is two, the channel matrix. H of Equation 2 has two column vectors. If the number of RUs included in the RU set is n, the channel matrix H of Equation 2 has n column vectors.

Equation 6 may be used to determine whether the channel matrix between the RU set and the UE is full rank. For example, the base station 100 may determine whether the channel matrix is full rank based on the condition $\Omega_{r,2}-\Omega_{r,1} \neq 0$ calculated from $\phi_{r,1}$ and $\phi_2$ (referred to FIG. 2). The base station 100 may exclude an RU set of which $\Omega_{r,2}-\Omega_{r,1}=0$ (or a determinant of the channel matrix is 0 (det H=0)) from the decision of the RU set.

The variables $\phi_{r,i}$ (i=1,2) are defined by the angle between the line of the array of the ULA and the direction of the beam generated by the ULA. An example to calculate the value of these variable is as follows. The base station 100 according to the exemplary embodiment calculates the directional cosine based on the height of the RU (height H from the ground) and a distance between the RUs included in the RU set and the UE 300.

Then, the base station 100 may determine whether the condition $\Omega_{r,2}-\Omega_{r,1} \neq 0$ is satisfied based on the directional cosine $\Omega$. Equation 10 may be used to determine whether the channel between the RU set and the UE is the well-condition.

The base station 100 may determine whether the state of the channel between the RU set and the UE is the well-condition according to whether a ratio of $\lambda_1^2$ and $\lambda_2^2$ that are the singular value of the channel matrix H is 1. The base station may determine an RU set capable of maximizing the frequency efficiency by combination of the conditions derived from Equation 6 and Equation 10.

For example, the base station 100 may determine an RU set satisfying $\Omega_{r,2}-\Omega_{r,1} \neq 0$ among m RU sets of which ratio of the singular values of the channel matrix is closest to 1. The m RU sets of which the ratio of $\lambda_1^2$ and $\lambda_2^2$ is close to 1 may be determined in order close to 1.

Alternatively, the base station 100 may determine an RU set of which the ratio of $\lambda_1^2$ and $\lambda_2^2$ of the channel matrix His closest to 1 among m RU sets of which $\Omega_{r,2}-\Omega_{r,1} \neq 0$ is satisfied (or m RU sets of which the determinant of the channel matrix is not 0). The RU set includes at least two RUs.

Then, the BS 100 determines a distributed precoding matrix of which a diversity order is predetermined (S130). Equation 12 represents a relationship between a data symbol matrix $X=[x_1 \, x_2]^T$ and a precoded signal $S=[s_1 \, s_2]^T$ when two RUs is selected by the base station 100.

$$\begin{bmatrix} s_1 \\ s_2 \end{bmatrix} = \begin{bmatrix} h_{11} & h_{12} \\ h_{21} & h_{22} \end{bmatrix} \begin{bmatrix} x_1 \\ x_2 \end{bmatrix} \quad \text{(Equation 12)}$$

The BS 100 transmits the signal precoded by using the distributed precoding matrix of Equation 12 to the UE 300 through the selected RU 200 (S140). That is, the elements $x_1$ and $x_2$ of the data symbol X are precoded by the distributed precoding matrix C before being transmitted to the UE 300 through layers 1 and 2, respectively.

Equation 13 represents an example of a distributed precoding matrix C having an element $h_{i,j}$ (i, j=1, 2).

$$C = \begin{bmatrix} 1 & e^{j\phi_1} \\ e^{j\phi_2} & 1 \end{bmatrix}, \phi_1 + \phi_2 \neq 0 \quad \text{(Equation 13)}$$

The $\phi_1$ and $\phi_2$ of Equation 13 are angles formed by the beam toward the UE 300 of each RU 200 with respect to the direction in which the element antennas of the array antenna of the UE 300 are arranged (referred to FIG. 2). According to an exemplary embodiment, the base station 100 may determine a distributed precoding matrix based on the angle formed by the transmission beam from the RU 200 to the UE 300 with respect to the direction in which the elementary antennas of the array antenna of the UE 300 are arranged.

The distributed precoding matrix of Equation 13 is a matrix corresponding to the diversity order 4, and base station 100 may determine the distributed precoding matrix corresponding to the diversity order which is predetermined. The distributed precoding matrix may be one of precoding matrix determined in the regulations of a cellular communication.

Referring to FIG. 9, the base station 100 transmits signals by using the distributed precoding matrix corresponding to the diversity order 2, so that the UE 300 may analyze the received signals from the two RUs to be the same as the signals reflected by the cluster 1 (120° from the ground) and the cluster 2 (−175° from the ground) of FIG. 4. That is, the signals having the diversity order 2 may be transmitted to UE 300 according to the distributed precoding matrix.

Alternatively, referring to FIG. 10, the base station 100 transmits signals by using the distributed precoding matrix corresponding to the diversity order 4, so that UE 300 may analyze the received signals from the two RUs to be the same as the signals reflected by the cluster 1 (60° from the ground) and the cluster 2 (−175° from the ground) of FIG. 6. That is, the signals having the diversity order 4 may be transmitted to UE 300 according to the distributed precoding matrix.

According to the exemplary embodiment described above, it is possible to transmit a signal capable of maximizing the frequency efficiency and obtaining the diversity gain based on precoding in a LoS environment using a carrier of a short wavelength such as a millimeter wave.

Figure 12:
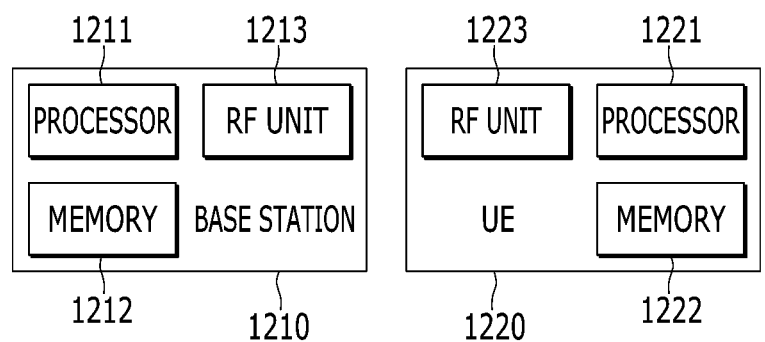
FIG. 12 is a block diagram illustrating a wireless communication system according to another exemplary embodiment.

FIG. 12 is a block diagram illustrating a wireless communication system according to another exemplary embodiment.

Referring to FIG. 12, a wireless communication system according to an exemplary embodiment includes a BS 1210 and a UE 1220.

The BS 1210 includes a processor 1211, a memory 1212, and a radio frequency unit (RF unit) 1213. The memory 1212 may be connected to the processor 1211 to store various pieces of information for driving the processor 1211 or at least one program executed by the processor 1211. The radio frequency unit 1213 may be connected to the processor 1211 to transmit/receive a wireless signal. The processor 1211 may implement functions, processes, or methods proposed by the exemplary embodiment. In this case, in the wireless communication system according to the exemplary embodiment, a wireless interface protocol layer may be implemented by the processor 1211. An operation of the BS 1210 according to the exemplary embodiment may be implemented by the processor 1211.

The UE 1220 includes a processor 1221, a memory 1222, and a radio frequency unit (RF unit) 1223. The memory 1222 may be connected to the processor 1221 to store various pieces of information for driving the processor 1221 or at least one program executed by the processor 1221. The radio frequency unit 1223 may be connected to the processor 1221 to transmit/receive a wireless signal. The processor 1221 may implement functions, processes, or methods proposed by the exemplary embodiment. In this case, in the wireless communication system according to the exemplary embodiment, a wireless interface protocol layer may be implemented by the processor 1221. An operation of the UE 1220 according to the exemplary embodiment may be implemented by the processor 1221.

According to the exemplary embodiment of the present disclosure, the memory may be positioned inside or outside the processor and the memory may be connected to the processor through already known various means. The memory may be various types of volatile or non-volatile storage media. For example, the memory may include a read-only memory (ROM) or a random access memory (RAM). While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A method for transmitting a signal to user equipment (UE) by using a plurality of radio units (RUs) connected to a base station, the method comprising:
   determining an RU set including at least two RUs of the plurality of the RUs based on directional cosines between the at least two RUs and the UE and spatial signature functions having the directional cosines as variables;
   determining a distributed precoding matrix to which a predetermined diversity order corresponds based on information about an RU included in the RU set; and
   performing a precoding based on the distributed precoding matrix and transmitting a precoded signal to the UE through the RU set,
   wherein the determining of the RU set includes:
   determining whether a difference between a first directional cosine and a second directional cosine is not 0, wherein the first directional cosine is determined between the UE and a first RU of the at least two RUs and the second directional cosine is determined between the UE and a second RU of the at least two RUs;
   determining whether an inner product of a first spatial signature function and a second spatial signature function is a smallest absolute value of an inner product of spatial signature functions of pairs of RUs of the plurality of the RUs, wherein the first spatial signature has the first directional cosine as a variable and the second spatial signature has the second directional cosine as a variable; and
   determining the RU set including the first RU and the second RU when the difference is not 0 and the inner product is the smallest absolute value.

2. An apparatus for transmitting a signal by using a plurality of radio units (RUs) to user equipment (UE), the apparatus comprising:

a processor, a memory, and a radio frequency unit (RF unit), wherein the processor executes a program stored in the memory to perform:

determining an RU set including at least two RUs of the plurality of the RUs based on directional cosines between the at least two RUs and the UE and spatial signature functions having the directional cosines as variables;

determining a distributed precoding matrix to which a predetermined diversity order corresponds based on information about an RU included in the RU set; and performing a precoding for the signal based on the distributed precoding matrix and transmitting precoded signal to the UE through the RU set, wherein when a difference between a first directional cosine and a second directional cosine is not 0 and an absolute value of an inner product of a first spatial signature function and a second spatial signature function is a smallest absolute value of an inner product of spatial signature functions of pairs of RUs of the plurality of the RUs, the RU set including a first RU and a second RU among the at least two RUs is determined, and wherein the first directional cosine is determined between the UE and the first RU and the second directional cosine is determined between the UE and the second RU, and the first spatial signature has the first directional cosine as a variable and the second spatial signature has the second directional cosine as a variable.

* * * * *